United States Patent [19]

Ipcinski et al.

[11] Patent Number: 4,818,827  
[45] Date of Patent: Apr. 4, 1989

[54] LOW FORCE MEMBRANE SWITCH

[75] Inventors: Ralph G. Ipcinski, Hollis, N.H.; Douglas M. Odom, Phoenix, Ariz.

[73] Assignee: AMP Incorporated, Harrisburg, Pa.

[21] Appl. No.: 178,666

[22] Filed: Apr. 7, 1988

[51] Int. Cl.$^4$ .................... H01H 13/70; H01H 11/00; B05D 5/12
[52] U.S. Cl. ..................................... 200/5 A; 29/622; 178/18; 200/512; 427/58; 427/96
[58] Field of Search .................. 200/5 A, 159 B, 86 R, 200/292, 308, 317; 29/622; 178/18; 427/58, 96

[56] References Cited

U.S. PATENT DOCUMENTS

| | | | |
|---|---|---|---|
| 2,843,695 | 7/1958 | Osuch et al. | 200/86 R |
| 3,996,430 | 12/1976 | Eberwein et al. | 200/5 A |
| 4,143,253 | 3/1979 | Wagner et al. | 200/5 A |
| 4,217,473 | 8/1980 | Parkinson | 200/5 AX |
| 4,287,394 | 9/1981 | Hargita et al. | 200/5 A |
| 4,360,716 | 11/1982 | Fiorella | 200/5 A |
| 4,391,845 | 7/1983 | Denley | 200/5 A X |
| 4,564,079 | 1/1986 | Moore et al. | 178/18 |
| 4,587,378 | 5/1986 | Moore | 178/18 |
| 4,694,126 | 9/1987 | Aiken, Jr. et al. | 200/5 A |
| 4,701,579 | 10/1987 | Kurachi et al. | 200/5 A |

Primary Examiner—J. R. Scott  
Attorney, Agent, or Firm—Katherine A. Nelson

[57] ABSTRACT

The invention is directed to a membrane switch comprising a first layer 30 of flexible insulating material and a second layer 50 having relatively inflexible characteristics, each layer 30, 50 having an array of conductors 40, 54 disposed thereon and defining a plurality of switch point areas over a substantial portion of the respective layers. The first sheet is transparent and carries visible symbols on the inner surface thereof formed by a first layer 36 of inks printed thereon and further includes a barrier coating over such symbols to provide contrast therefore. The first array 40 of conductors is printed on the barrier coating. The second array 54 of conductors is printed on the inflexible layer. The first and second arrays 40, 54 of conductors are connected to respective voltage sources, preferably by further arrays of conductors 42, 56 disposed over at least portions of the first and second arrays, 40, 54 the further arrays 42, 56 being of a material having a higher conductivity than the material used for the first and second arrays 40, 54. Spacer means 58 for the switch is formed by printing an array of spaced apart dots of a dielectric and insulating coating on top of at least one of the arrays of conductors in the defined switch point areas to hold the switch point areas normally apart until pressure is placed thereupon to deform the first sheet 30 and effect a switch closure between corresponding switch point areas of the arrays 40, 54. A method for making the switch is also disclosed.

12 Claims, 6 Drawing Sheets

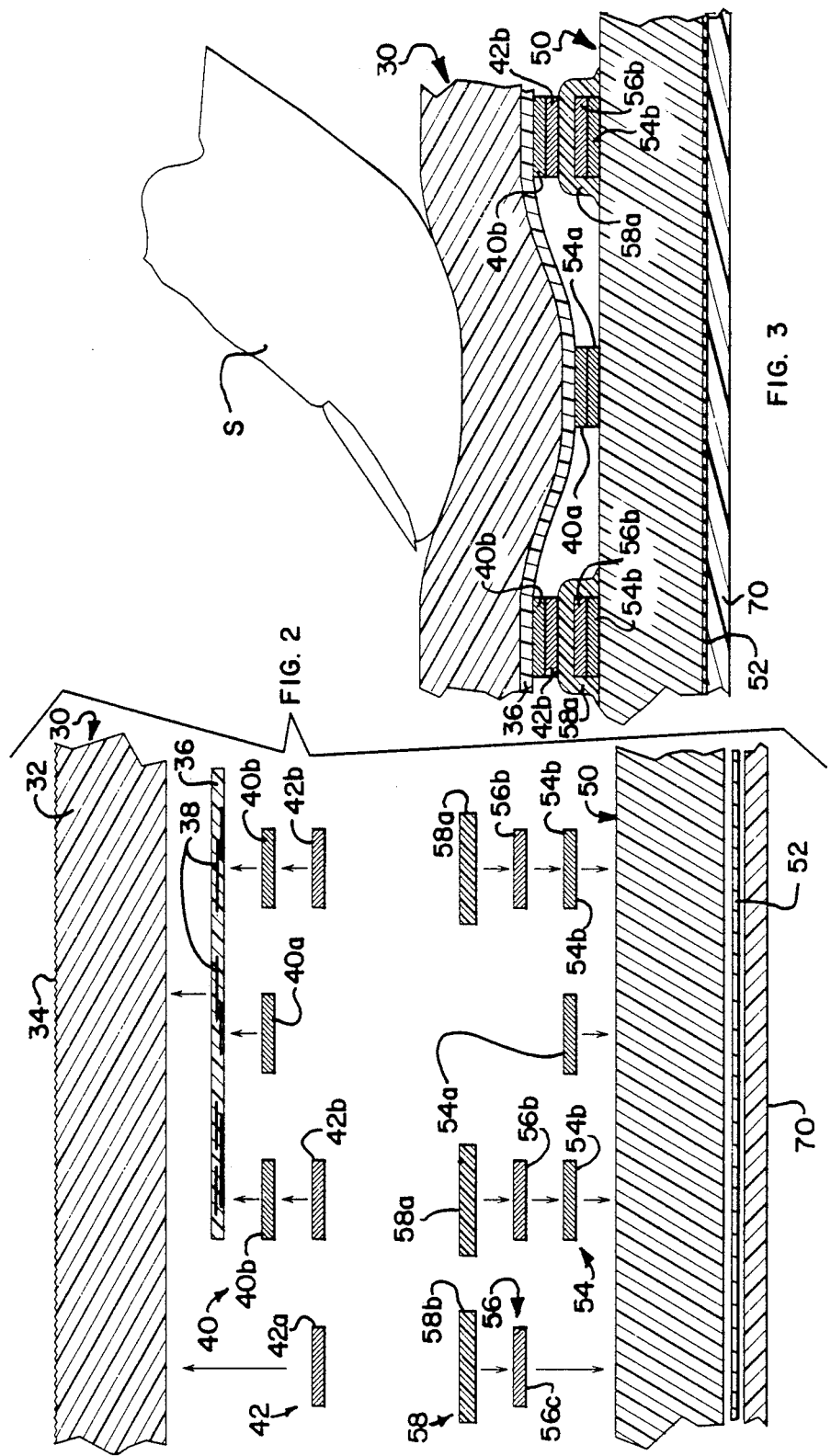

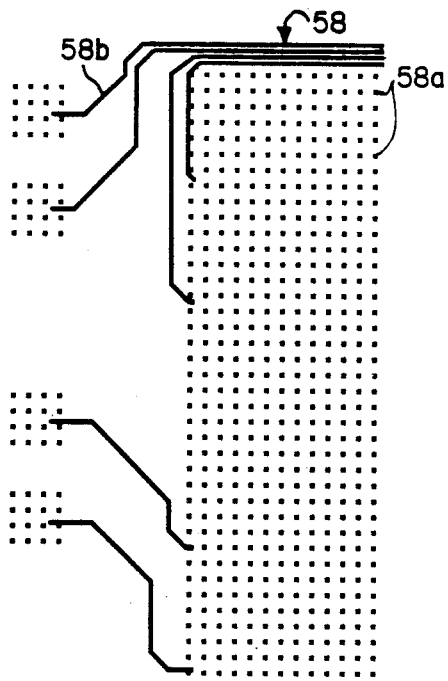
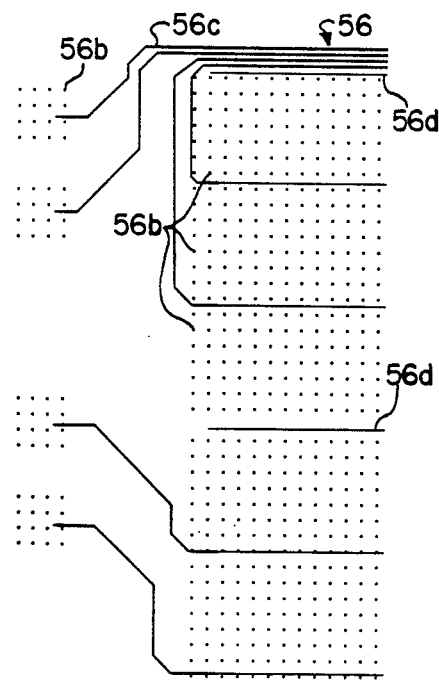
FIG. 10  FIG. 9
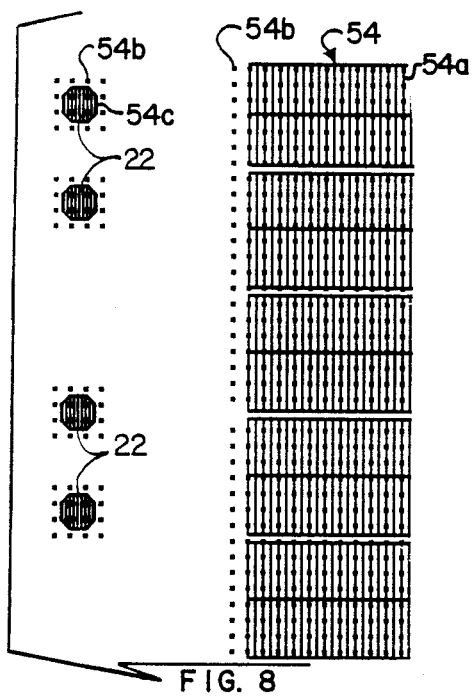
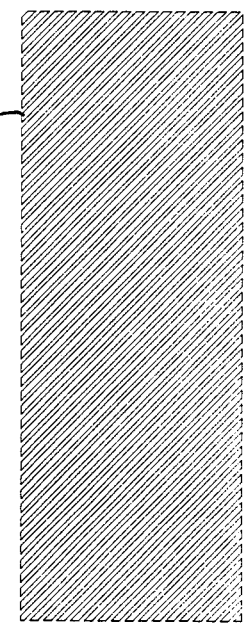
FIG. 8  FIG. 11

LOW FORCE MEMBRANE SWITCH

FIELD OF INVENTION

This invention relates to membrane switches and particularly to membrane switches requiring a sensitive, or low force, actuation for use in conjunction with instructive overlays.

BACKGROUND OF INVENTION

Membrane switches are widely used as a special type of keyboard for calculators, computers, input devices for manipulating equipment and machinery, and for educational purposes. In U.S. Pat. No. 4,360,716 granted Nov. 23, 1982, such a switch is shown in conjunction with a learning aid wherein a template having symbols thereon is laid over the switch so that an operator, when touching such symbols, will activate such switch. This patent includes a teaching of providing conductive traces on the inner surfaces of plastic sheets held apart by screened or coated insulating dots or points on spaced centers; the combination providing what is called a broad area actuated switch. This means that relatively broad areas of switch action are defined by the conductive traces rather than specific points.

In U.S. Pat. No. 4,391,845 issued July 5, 1983, there is a membrane switch disclosed which is a point-type switch, meaning that the switch contains a number of discrete switch points, each of which is typically associated with a symbol such as one through ten or zero or a letter, or some other such instructive symbol. The 4,391,845 patent teaches the use of spacer areas which are separated from the contact paths, or traces of the switch, and which, in this patent, may be made of insulating materials screened or coated to be isolated from conductive traces. These isolated traces are taught as being built up of layers which may be either conductive ink as a first layer or have additional layers of nonconductive ink and/or an adhesive material.

These patents form a background for the present invention which has as its object the provision of a membrane switch having only two plastic layers and screen printed conductive traces with screen printed insulating spacers in conjunction with a coating carrying symbols and instructions arranged to be sufficiently thin and responsive to touch as to be actuated through multiple pages laid over the top of the switch in the manner of a book. It is a further object of the invention to provide a low-cost and sensitive membrane switch for use in conjunction with instructive aids which minimizes the use of insulating sheets of which the switch contains only two, and therefore the associated labor required by the object of the invention to provide a membrane switch which can be fabricated by a variety of processing steps, including printing, screening, lithography for both appearance and symbol purposes, and for conductive and insulating traces and moreover, wherein the various coatings are protected against wear, moisture and damage by being within the envelope of the membrane switch.

SUMMARY OF THE INVENTION

This invention relates to a method and apparatus. The method here taught embraces the steps of printing, screening, or coating a thin, flexible membrane sheet of plastic material in a variety of steps and colors forming indicia in terms of symbols, instructions, and with decorative appearance and thereafter over the top of such coating, screening or printing layers of conductive, insulating, and adhesive materials to form an area switch network. The method provides the basis of a membrane switch which is thinner than heretofore used wherein such instructive coatings were typically on the opposite side of the switch coatings, or outside of the switch envelope and required a protective film layer thus rendering a laminated construction less flexible than desired. The apparatus of the invention embraces a membrane switch of the area variety which contains only two layers of plastic sheet material with the rest of the switch including symbols and instructions, conductive traces and insulation spacers and adhesives being achieved through multi-pass printing or screening to define extremely thin coatings allowing for optimum sensitivity. This sensitivity to the touch of an operator allows use of the switch with the so-called "talking book" applications wherein books of up to 12 or more pages of thin paper or plastic may be laid over the membrane switch and the switch activated by pressing through the sheets of the book. Other switch functions are provided in addition to the area switches for responsive instructions, such as yes, no, on, off inputs.

IN THE DRAWINGS

FIG. 2 is a schematic, exploded cross-sectional view of the various layers and coatings comprising the switch of the invention shown much enlarged from actual size;

FIG. 3 is a view of the switch component shown in FIG. 2, but assembled as in actual use with the finger of an operator effecting switch closure;

Figure 6:
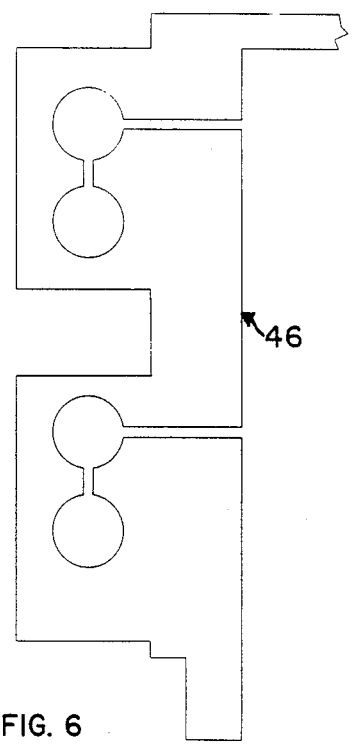
Figures 4, 5:
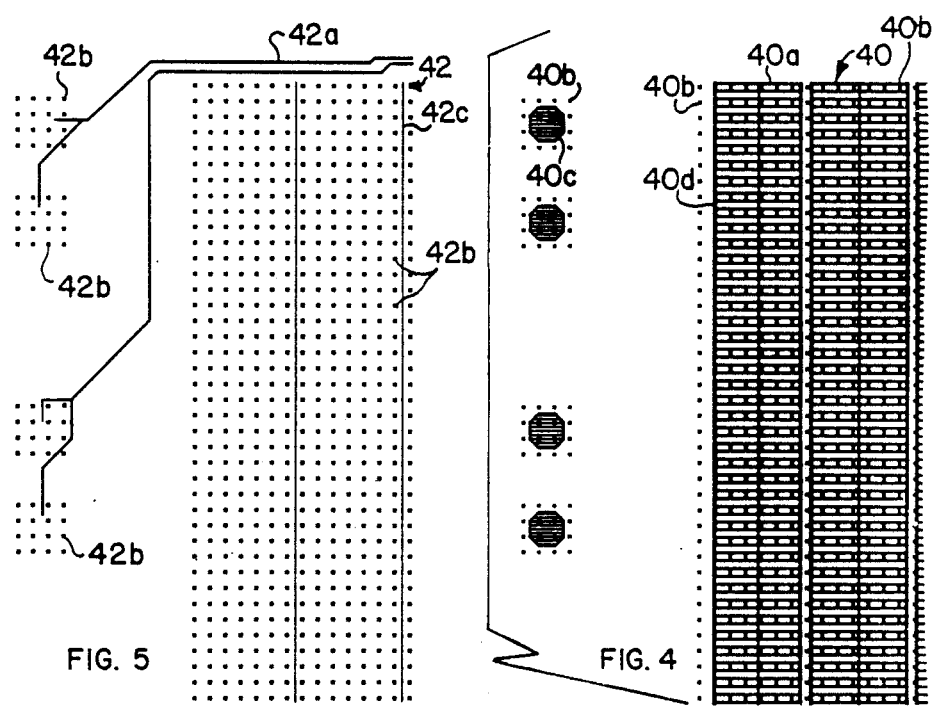
Figure 7:
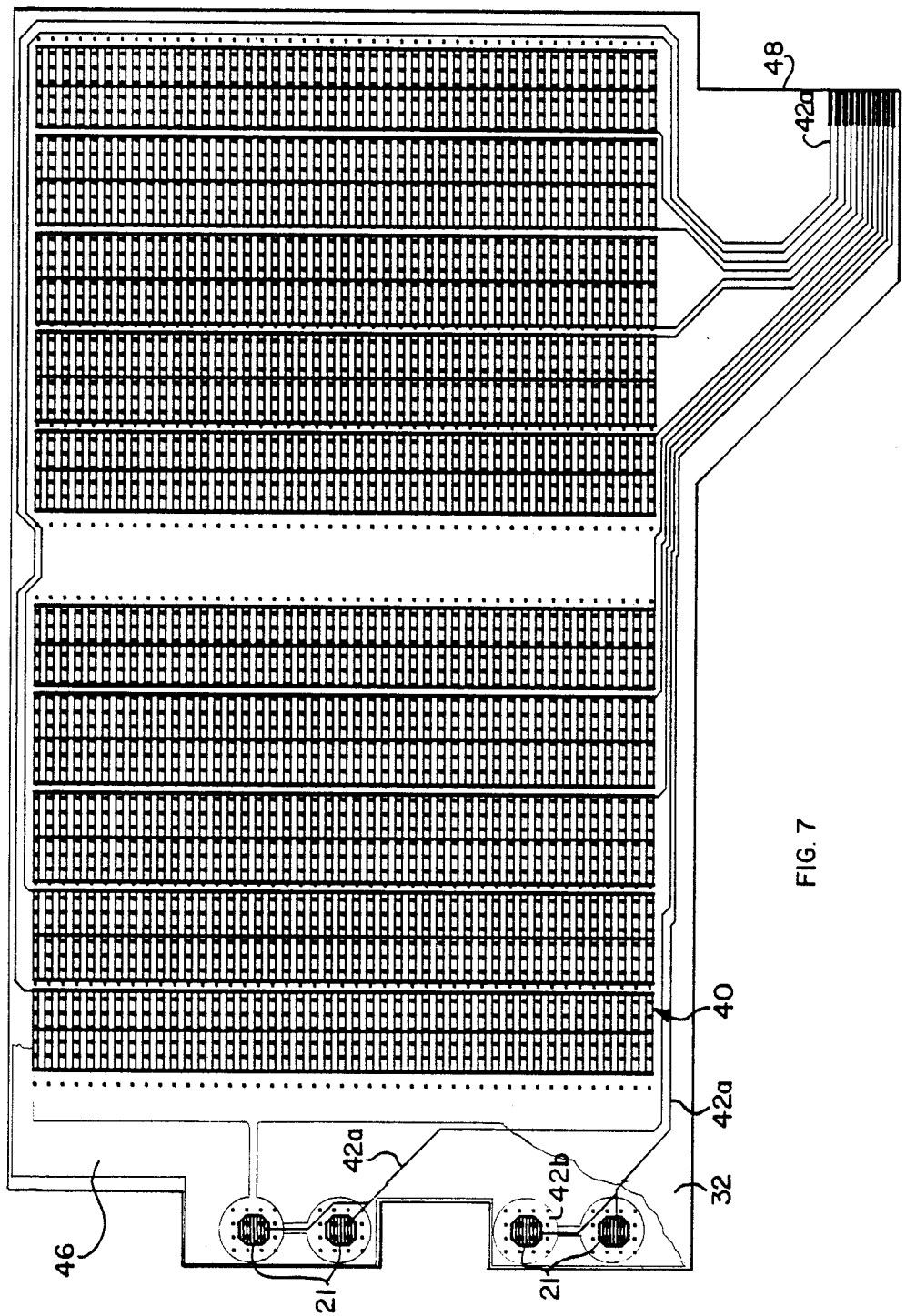

FIGS. 4, 5, and 6 are plan views of a portion of the membrane part of the switch, showing respectively three of the coatings employed;

FIG. 7 is a plan view of the membrane side of the switch showing several representative coatings, and in addition, conductive traces leading to a connector input and output area;

FIGS. 8, 9, 10, and 11 are plan views showing portions of the bottom, or fixed, part of the switch, showing various coatings employed to effect switch structure.

Figure 12:
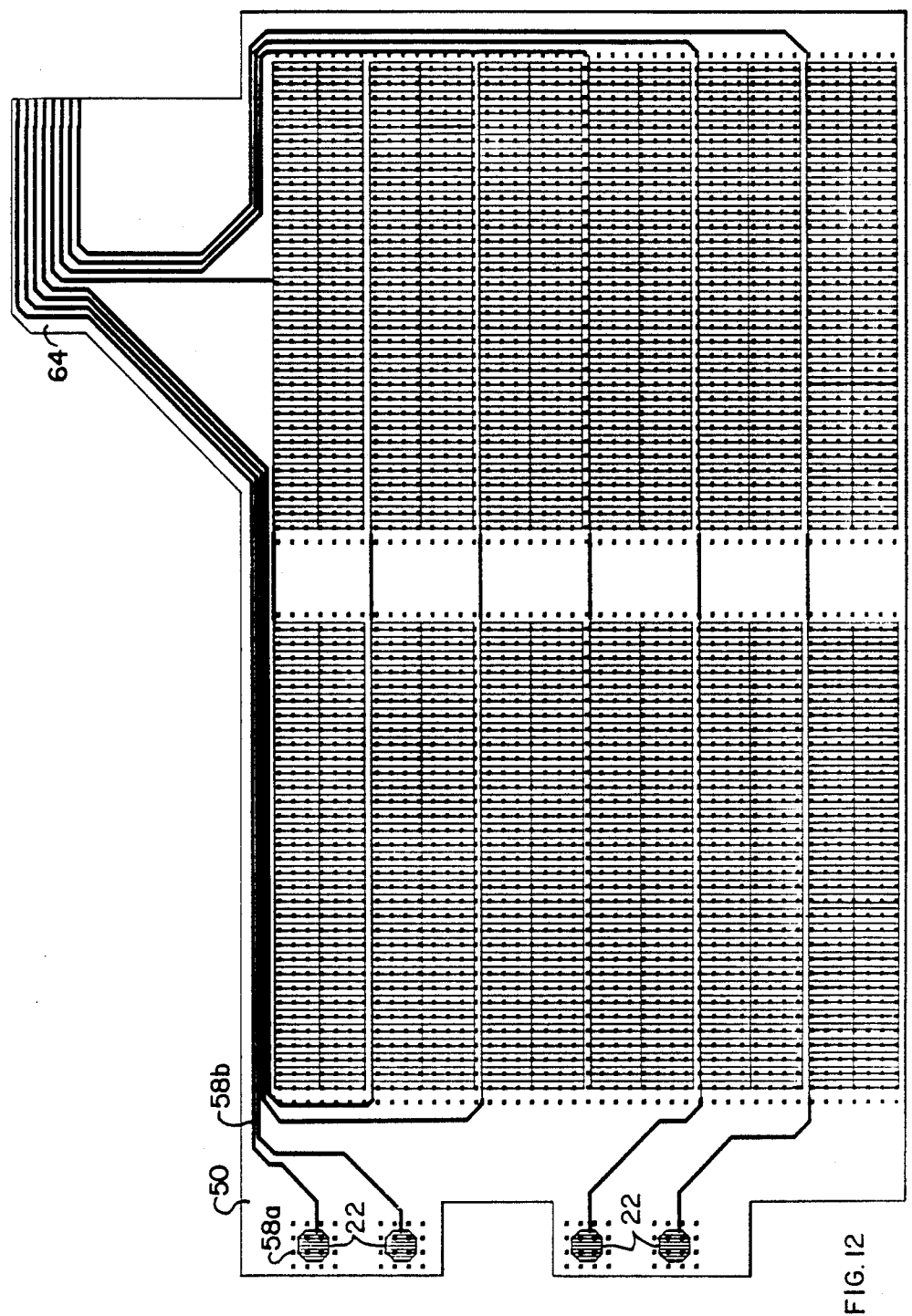

FIG. 12 is a plan view showing the assembly of coatings of FIGS. 8 through 11 in representation.

DETAILED DESCRIPTION OF THE INVENTION

Figure 1:
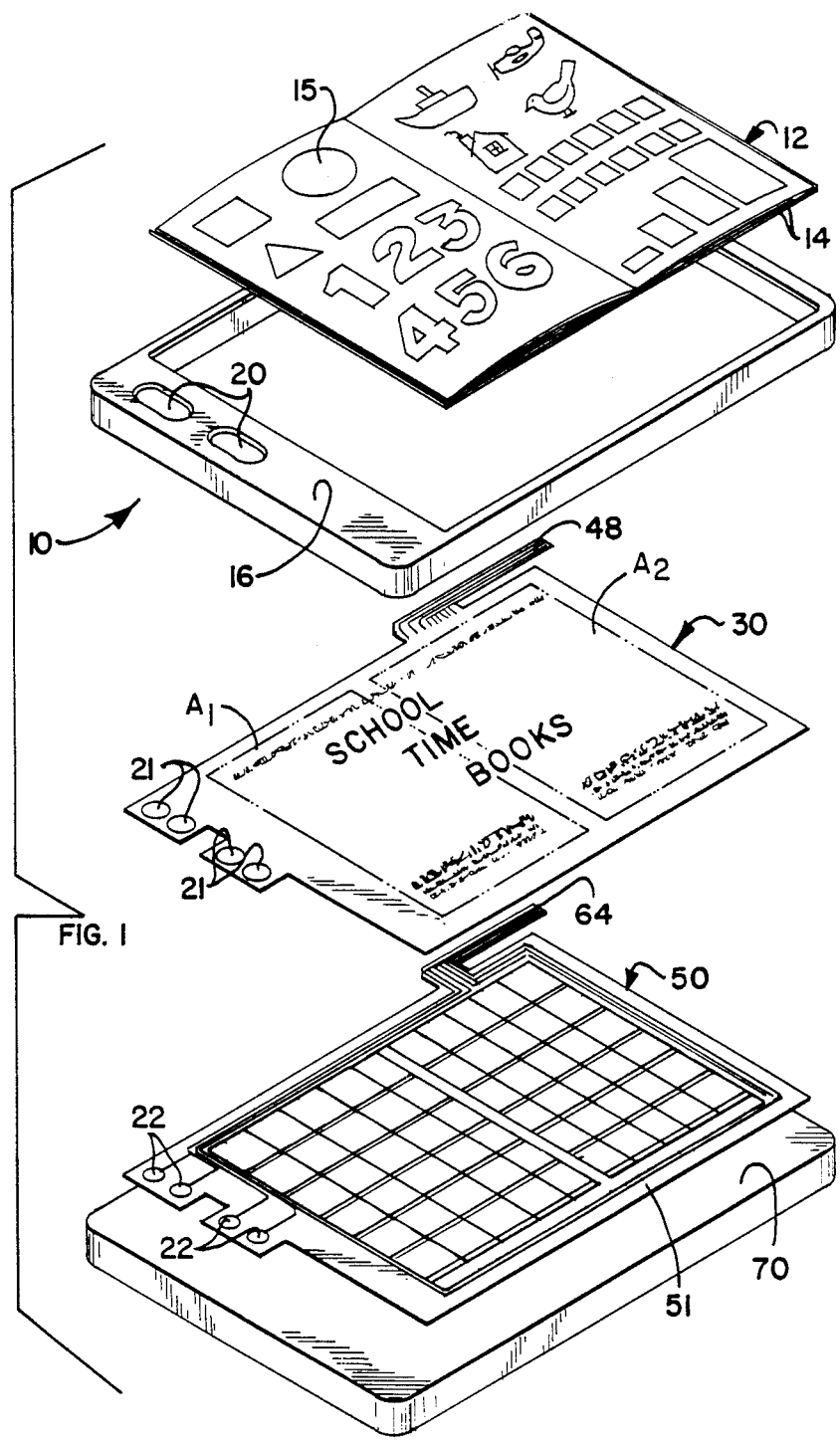
FIG. 1 is a scaled down perspective of the switch of the invention shown in conjunction with one preferred use, the various elements exploded for clarity.

Referring now to FIG. 1, there is shown a preferred embodiment of the invention in the form of a teaching aid, here stylized for use with pre-school learning levels, it being understood that the invention concepts have uses in a wide variety of applications wherein the same needs for sensitivity, and therefore thinness, of switch laminated structure obtain. As shown in FIG. 1, there is a "book" 12 made up of leaves, or sheets, 14 which typically are of thin paper or thin plastic having printed thereon symbols 15 forming indicia. The book 12 is designed to fit into a plastic frame 16, which itself fits over the top layer 30, which is the membrane part of the switch of the invention. The layer 30 in turn fits over and is laminated to the lower layer of the switch, such layer shown as 50, which itself is bonded to the flat top surface of a frame 70. In use, the layers 30 and 50 are bonded together and bonded to frame 70 with the frame 16 attached to frame 70 permanently. Electronic circuits may be contained beneath the upper surface of frame 70 including, for example, a speaker for audio output and various logic and memory circuits to facilitate the intended use of the device. The frame 16 includes separate apertures 20 which line up with switch areas 21, 22 on respective layers 30, 50, which form the membrane switch.

Each of the layers 30 and 50 includes tails shown as 48 and 64 which carry conductive traces to the conductive areas of the two layers respectively. As can be discerned in FIG. 1, the membrane switch layer 30 includes two broad areas A1 and A2 of switch location, such areas coinciding with the areas of symbols on the leaves 14 of book 12.

In use, the device 10 may be manipulated through instructions given aurally, and the manipulation of switches 21 which, in the embodiment shown, include four switch structures, in conjunction with the touching of the various symbols in book 12 which serve to close switches under such symbols through the membrane layer 30 and its associated layer 50.

Turning now to FIG. 2, a much enlarged and sectioned schematic reveals the layers 30 and 50 with the various coatings to be applied thereto shown separated. Layer 30 which is indeed the membrane or flexible part of the switch includes a sheet 32 of plastic insulating material which may be fabricated from a wide variety of sheet materials which are insulating and have good dielectric properties, are essentially transparent and clear, and adequately flexible to serve the switch function. The material Lexan, a polycarbonate manufactured by the General Electric Company was used in an actual embodiment, the material chosen being on the order of b 0.005 inches in thickness and of the so-called "velvet" type, having one side textured, the other side being smooth or slick and coated or printed upon to define half of the switch of the present invention. Such texturing is shown as 34 in FIG. 2. In accordance with the method of the invention, rolls or sheets of material 32 are fed through appropriate printing or screening equipments in a series of passes laying down a series of layers. In accordance with the invention, the first layer to be laid down is 36, and this layer is comprised of a series of printings or screenings shown as 38 to form the symbology and color of the switch to be seen through the top of the switch, and at the same time, protected by the sheet 32 against wear through use or damage by accident. In an actual embodiment, the colors laid down in order included yellow, blue, a light purple, and a dark purple, with a final screen barrier of off-white; the total thickness of such screenings being on the order of 0.00125 inches in thickness. Protection of instruction symbology and indeed of the switch structure itself is most particularly required in the switch points 21 which are directly engaged repeatedly in the use of device 10. Since the bulk of the actuation of the remaining areas is through leaves 14 of book 12, wear of the symbols is less relevant in this particular embodiment, but it is to be understood that the invention in this aspect embraces other applications where such wear is more critical.

The layer or coating 36, including the various steps of printing, may be achieved through standard silk-screening techniques, or even indeed, through lithographic multi-pass printing. A wide variety of colored and white inks of either the solvent or nonsolvent, ultraviolet curable types are available and known to those in the printing arts. Characteristics of stability, some flexibility, thinness, and insulating quality characterize the need for the printing forming the layer 36.

Next, in accordance with the method of the invention, a layer shown as 40 in FIGS. 2 and 4 is screen-printed on top of the layer 36 to form the bulk of the conductive array on the membrane part 30 of the switch. The pattern that is illustrated in FIG. 4 includes a series of bars 40a and a series of dots 40b interconnected to each other by small carbon or graphite traces 40d. Carbon and graphite inks readily commercially available, of the so-called solvated type are preferred, and when utilized with standard silk-screening techniques, one pass will provide a thickness of on the order of 0.0004 to 0.0006 inches in thickness, found adequate for the present use which calls for a carbon trace on the order of 0.050 inches in width and which, as will be described hereinafter, is made in conjunction with the more conductive traces of a silver composition ink. The dots 40b are on the order of 0.050 inches in width and by 0.050 inches in length; the same thickness being employed as they are laid down in the same pass as the legs 40a. Also shown in FIG. 4 are the separate switch points 21, including a carbon bar structure 40c and additional dots 40b.

The next step in accordance with the method of the invention is the printing as by screening of a conductive ink containing metal particles such as silver which is more conductive than that of the carbon traces of the layer 40. The more conductive layer is shown as 42 in FIGS. 2 and 5. As can be discerned in the latter Figure, the layer 42 includes a series of dots 42b screened on top of the dots 40b of the carbon layer 40. Additionally, are provided conductive traces 42a and 42c, which extend from the switch points 21 along the length membrane switch layer 32, being directly bonded to the surface of 32 to provide low resistance paths to such switch points. The conductive traces 42c which are laid down over portions of the carbon layer reduce the overall resistance of the path from the switch points formed by such layer to the sources of voltage for switches as connected through the tails 48 and 64 heretofore mentioned.

In an actual embodiment, the more conductive material was a DuPont silver ink known as 5007 which through normal silk-screening practice, provides a thickness on the order of 0.0005 inches and a conductivity many times that of carbon. As can be appreciated, the use of the silver ink in the manner disclosed optimizes the factors of low resistance and low cost, the bulk of the printed area being comprised of carbon. The width of the silver trace employed in this thickness is on the order of 0.025 inches.

Next, in accordance with the method of the invention, a layer of adhesive shown as 46 in FIG. 2 and in FIG. 6 is applied directly to the interior surface of layer 32. As can be seen in FIG. 6, the switch activation areas 21 are left free of adhesive. Certain of the traces 42a are, however, covered over by the adhesive and, while not shown altogether, it is to be understood that the free areas around the periphery of the switch, including the spine area 51 as shown in FIG. 1, are employed to accommodate the adhesive to get an effective laminated structure and sealing.

In FIG. 2, the lower or fixed portion of the membrane switch of the invention is shown including a plastic sheet 50 which, in the preferred embodiment, was constituted by a polyester film material such as Mylar from the DuPont Company, EL or D grade, on the order of 0.005 inches in thickness. The sheet 50 includes on the bottom surface thereof, as shown in FIG. 2, a layer of adhesive 52 which is typically 0.001 inches in thickness of a screen permeable rubber-based material, typically solvated and cured by heat. The sheet 50 is bonded by the layer 52 in the manner shown in FIG. 3 to the frame 70 which represents a rigid and flat or planar surface. Again referring to FIG. 2, the top surface of sheet 50 contains a first layer 54 of carbon or graphite material screened thereon having essentially the same thickness and width dimensions of the layer 40 heretofore described with respect to the membrane portion of the switch. Comparing FIGS. 7 and 12 reveal that the orientation of the bar structures of the carbon layers 40 and 54 are at right angles to one another. Both FIGS. 7 and 12 are top plan views of the respective printed surfaces. When the surfaces are placed in overlying relationship, tail 48 of FIG. 7 overlies tail 64 of FIG. 12. Referring to FIG. 8, the carbon layer 54 on sheet 50 is shown to include bars 54a, dots 54b, and separate switch areas 22 includes bars 54c which are essentially identical to the structures of carbon layer 40 heretofore described, except with the direction or orientation thereof.

Next, as shown in FIGS. 2 and 9, a layer of the more conductive ink, referred to as the silver composition ink, is shown as 56 which is deposited on top of the carbon layer 54 but selectively at the spacer dot areas 54b and additionally along conductive traces shown as 56c and 56d in FIGS. 9 and 12. The screening effecting layer 56 is of a material and thickness and characteristics essentially the same as heretofore described with respect to layer 42.

Next, in accordance with the invention and referring to FIGS. 2 and 10, a dielectric screening, including a layer 58, is applied over the dots formed in layers 54 and 56 and additionally over the conductive traces 56c. The dielectric layer formed thereby is shown with respect to the dots as 58a and with respect to the conductive traces as 58b. A dielectric utilized in an actual embodiment was comprised of a screen printable dielectric ink which is UV curable and available as a resin from W. R. Grace and Company. Such dielectric in a single pass represented a thickness of on the order of 0.0011 plus or minus 0.0001 inches in thickness and was of a width on the order of 0.060 inches. By placing the dielectric spacer material on the fixed or rigid side of the switch, namely on layer laminate 50, the stiffening effect of the dielectric, particularly as with respect to the conductive traces and the circuit runs 58b is made irrelevant to switch action, all movement taking place in the upper layer or in layer 30.

To lend perspective to the foregoing, reference is made to FIG. 3 wherein a stylus or the fingers of an operator is shown depressing the upper layer 30 to effect a switch closure between the carbon traces 40a and 54a. It is to be noted how the various layers of carbon and silver ink and dielectric in the dot regions operate to define a normally open switch but allowing closure through a very slight deflection of the beam structure represented by the upper layer 30 supported by the essentially columnar stacking of the various layers. The open spacing between carbon traces 40a and 54a is essentially the thickness of the two layers of silver ink plus the thickness of the dielectric layer as stacked in a given dot area. It has been found that the utilization of the silver ink layer over the carbon layer in the dots areas aids in defining the spacing in terms of consistency over the area of the switch. It is contemplated that on occasion, and depending upon application, more spacing can be provided by thicker coatings of either carbon, silver, or dielectric material, or in some cases, a second pass of one or several of these materials in the silk screening of the laminates. It is also contemplated that an added layer of adhesive may be applied to the dot areas to help in controlling delamination in use. It is worth noting that in the construction proposed here with respect to the present invention, the flexing and flexible part of the membrane switch, including the decorative or instruction coatings or layers, and the top layer or layer 30 is in an actual embodiment well under 0.010 inches in thickness, and indeed the entire stack to the top of the surface of the rigid layer or lower frame 70 is itself on the order of 0.010 inches in thickness or less.

Having now disclosed and described in a preferred embodiment the principles of the invention with the intention that those skilled in the art may practice it in both method and apparatus, we now set forth its definition in the following claims.

We claim:

1. A membrane switch comprising:
   a first sheet of flexible insulating material bonded in selected areas to a flat and planar surface of relatively inflexible characteristics, said first sheet being transparent and carrying visible symbols on the inner surface thereof formed by a first layer of inks printed thereon and further including a barrier coating over such symbols to provide contrast therefore;
   a first array of conductors printed on said barrier coating to define a plurality of switch point areas extending over substantial portions of said first sheet;
   a second array of conductors printed on the said inflexible surface to define a plurality of switch point areas extending over substantial portions thereof;
   means connecting said first and second arrays of conductors to respective voltage sources; and
   spacer means formed by printing an array of spaced apart dots of a dielectric and insulating coating on top of at least one of the arrays of conductors in said defined switch point areas to hold said switch point areas normally apart until pressure is placed thereupon to deform said first sheet and effect a switch closure between corresponding switch point areas of said arrays, the switch required a relatively low pressure to effect closure.

2. The switch of claim 1 wherein said first layer of ink is comprised of a plurality of areas of different colors to form symbols.

3. The switch of claim 1 wherein said first and second arrays of conductors are formed of inks of carbon derivative materials and wherein said means for connecting said first and second arrays of conductors to respective voltage sources includes first and second arrays of further conductors, said further conductor arrays also including portions thereof providing bussing means for said first and second arrays of conductors in each of said defined switch point areas, said further conductors being comprised of a significantly higher conductive material than that of said conductors whereby any voltage drop from a respective voltage source to respective of said first and second arrays of conductors is reduced.

4. The switch of claim 3 wherein said first and second arrays of further conductors are disposed in selected spaced apart locations along said first and second arrays of conductors, said locations corresponding to the locations of said dots of spacer means and underlying said dots of spacer means on said at least one first and second array of conductor, thus increasing the height of the spacer means without increasing the thickness of the dielectric dots.

5. The switch of claim 1 wherein the said first sheet and the said planar surface are spaced apart by the said coating on the order of 0.002 thousands of an inch.

6. The switch of claim 3 wherein the said thickness of the said first sheet of material combined with the thickness of said first layer of ink, the barrier coating and the said first array of conductors printed thereon is on the order of 0.006 to 0.009 inches in thickness and the spacing from center to center of said spacer means is on the order of between 0.125 and 0.175 inches.

7. The switch of claim 1 wherein said arrays of conductors and said spacer means are screen printing on the respective first sheet and inflexible surface.

8. The switch of claim 1 wherein said switch point areas of said first and second arrays of conductors comprise at least two elongated essentially parallel spaced conductors and a plurality of spaced crossbar conductors extending therebetween and essentially perpendicular thereto, said elongated conductors of the first array extending in a direction that is essentially perpendicular to the direction of the elongated conductors of the second array.

9. A method of manufacturing a membrane switch of a type characterized by having a first flexible sheet of transparent material having an outside surface and an interior lower surface, said first sheet of material being bonded at selective areas to a second sheet of material, said second sheet having an interior upper surface across the face thereof, and including spacer means selectively located across the bulk of the area of said interior lower and upper surfaces, the method including the steps of:
  printing through a series of passes, decorative and colored symbols of dielectric materials on the interior lower surface of said flexible sheet as a first layer to provide visible indicia;
  printing a first array of conductive materials forming half of a switch function on top of said first layer on said first sheet;
  printing a second array of conductive material forming the other half of a switch function on said upper surface of said second sheet;
  providing means for connecting said first and second arrays to respective voltage sources; and
  printing a layer of dielectric materials selectively on the second array as applied to said second sheet upper surface.

10. The method of claim 9 wherein the method further includes the step of printing a layer of adhesive in selected areas to at least one of the interior surfaces of said sheets to bond said sheets together.

11. The method of claim 9 further including the steps of providing a rigid surface as a base for said switch and adhering the lower surface of the second sheet to said base.

12. The method of claim 9 further including the step of printing a further conductive array formed of a material more conductive than the materials of said arrays such that said further arrays provides the means for connecting said first and second arrays to said respective voltage sources and further provides more conductive bussing means for commoning portions of the first and second conductive arrays.

* * * * *